G. B. ST. JOHN.

LANDSIDE FOR PLOWS.

No. 10,641. Reissued Aug. 25, 1885.

Witnesses.

A. B. Denison

E. M. Crawford

Inventor.

Garland B. St. John

By his Atty.

Justus M. St. John

N. PETERS, Photo-Lithographer, Washington, D. C.

UNITED STATES PATENT OFFICE.

GARLAND B. ST. JOHN, OF KALAMAZOO, MICHIGAN.

LANDSIDE FOR PLOWS.

SPECIFICATION forming part of Reissued Letters Patent No. 10,641, dated August 25, 1885.

Original No. 278,623, dated May 29, 1883. Application for reissue filed August 11, 1884.

*To all whom it may concern:*

Be it known that I, GARLAND B. ST. JOHN, a citizen of the United States, residing at Kalamazoo, in the county of Kalamazoo and State of Michigan, (formerly of Cedar Rapids, Iowa,) have invented certain new and useful Improvements in Landsides for Plows, of which the following is a specification.

My object in this invention is to lessen the friction and thereby lighten the draft of the plow by substituting for the ordinary landside a revolving blade or disk so adjusted that its face, near the lower periphery, bears against the unplowed land and prevents the plow from running in that direction.

The invention consists in the adaptation of such revolving blade or disk to the purposes of a landside, and also in the apparatus for attaching it to the plow.

Figure 1:
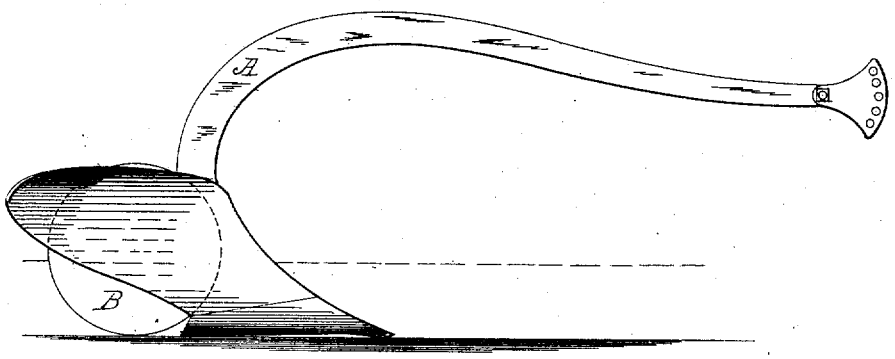
Figure 2:
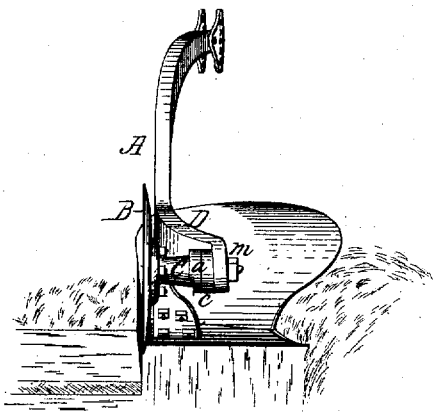

In the accompanying drawings, Figure 1 represents a side view of the plow; Fig. 2, a rear view of the same, showing the arrangement of the landside; and Fig. 3, the detail of the adjusting device.

In order to render the operation of a revolving disk effective as a landside it is preferably made of thin material similar to a rolling coulter, and sharp enough to enter the soil by the weight of the plow alone, and is set so that its outer face shall be practically in line with the furrow longitudinally, and at a slightly-different angle vertically from the cutting edge or shin of the mold-board, so that a segment of the lower part of the disk bears against the bank or landside of the furrow, leaving an opening above that point, as will be seen by reference to Fig. 2. Thus ordinarily the side pressure is borne by a very small portion of the disk and that at the point of least resistance, consequently the friction is much less than if the bearing were upon its whole face; but when an unusual pressure is brought against the mold-board the bearing of the disk extends to the whole height of the bank, thereby preventing undue crowding of the plow to land.

The result of using a thin-edged disk is that when the plow is thrown out of the ground by a stone or other obstruction the landside cuts into the ground again and holds the plow from crowding to land in getting the new furrow, as would be the case if the periphery of such landside-wheel were a broad surface. Besides, the cutting edge is better adapted to meet inequalities in the furrow itself by passing through them instead of riding over them.

In applying the invention either wood or iron beams may be used, the attachment varying accordingly. In the drawings only an iron-beam plow is represented. To the beam are attached a share and mold-board in the usual way. From the rear of the beam A extends a lug, D, so arranged that the axle of the revolving disk may be attached thereto. A change of angle is secured by means of the wedge-shaped washer *c*, placed between the supporting-lug and the axle, by turning the same to any point desired.

Figure 3:
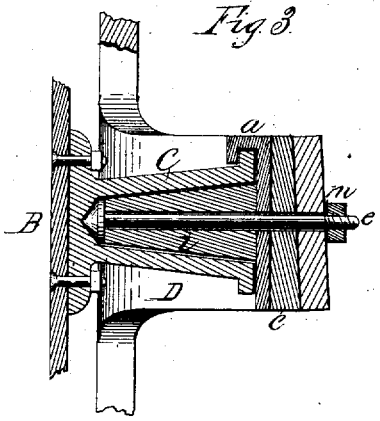

The arrangement of parts is shown in Fig. 3. C is a tapering hub terminating in a flange at each end. The landside-disk is connected to the flange at the smaller end. The hole in the hub corresponds to the outward taper, and does not pass entirely through it, but terminates in a rounded or slightly conical bottom. The axle *i* is a tapered plug fitting this hole, with a bolt, *e*, passing through it, the head of which fits the bottom of the hole described. The large end of the axle abuts against the face of a sand-band, *a*, and is held in place by means of the bolt *e*, which passes through such sand-band, the angular washer and the lug, and is drawn tightly by a large nut, *m*. The sand-band is provided with a partial annular recess in which the flange at the large end of the hub operates, and by which said hub is kept from slipping off the axle. As the pressure is mostly on the outer face of the landside, it will be seen that the principal wear is on the head of the bolt and the bottom of the hole. For increased durability these parts may be made very hard by chilling, tempering, or case-hardening. Being very simple in their construction they can be easily and cheaply replaced when worn out.

Having thus described my invention, what I claim as new, and desire to secure by Letters Patent, is—

1. A revolving blade-disk landside made thin and sharp to permit it to cut through inequalities in the bottom of the furrow and to penetrate the soil for the purpose of returning the plow to place when thrown out by obstructions, in combination with the plow, whereby the plane of the outer face of the disk intersects that of the furrow-bank near the bottom, leaving a narrow clearance above that line, substantially as and for the purpose set forth.

2. The combination of the revolving disk-landside B and the plow-beam A, having the axle-supporting lug D, adapted to bring the outer face of the disk practically in line with the furrow longitudinally, substantially as and for the purpose set forth.

3. In combination with a revolving landside, substantially as described, the hub C, axle *i*, bolt *e*, sand-band *a*, wedge-shaped washer *c*, and plow-beam A D, substantially as and for the purpose set forth.

Witness my hand this 24th day of July, A. D. 1884.

GARLAND B. ST. JOHN.

Attest:
F. D. DENLINGER,
A. F. BACON.